United States Patent
Chen et al.

(10) Patent No.: US 9,396,014 B2
(45) Date of Patent: Jul. 19, 2016

(54) DATA SWAP IN VIRTUAL MACHINE ENVIRONMENT

(71) Applicant: International Business Machines Corporation, Armonk, NY (US)

(72) Inventors: Chun Hai Chen, Beijing (CN); Yi Ge, Beijing (CN); Li Li, Beijing (CN); Liang Liu, Beijing (CN); Junmei Qu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 14/191,812

(22) Filed: Feb. 27, 2014

(65) Prior Publication Data

US 2015/0242231 A1    Aug. 27, 2015

(51) Int. Cl.
*G06F 9/455* (2006.01)
*G06F 3/06* (2006.01)

(52) U.S. Cl.
CPC .......... *G06F 9/45558* (2013.01); *G06F 3/0619* (2013.01); *G06F 3/0647* (2013.01); *G06F 3/0665* (2013.01); *G06F 2009/4557* (2013.01)

(58) Field of Classification Search
None
See application file for complete search history.

(56) References Cited

U.S. PATENT DOCUMENTS

| 8,099,568 | B2 | 1/2012 | Colbert | |
| 8,122,452 | B2 | 2/2012 | Comay | |
| 2006/0206687 | A1* | 9/2006 | Vega | G06F 12/10 711/206 |
| 2008/0091501 | A1 | 4/2008 | Bourke | |
| 2008/0271015 | A1* | 10/2008 | Ibrahim | G06F 9/45537 718/1 |
| 2009/0006801 | A1 | 1/2009 | Shultz | |
| 2010/0306770 | A1 | 12/2010 | Frank | |
| 2012/0030406 | A1 | 2/2012 | Chang | |
| 2013/0073779 | A1* | 3/2013 | Prasad | G06F 12/0684 711/6 |

FOREIGN PATENT DOCUMENTS

| WO | WO 2011/051164 A1 | 5/2011 |
| WO | WO 2011/120223 A1 | 10/2011 |

* cited by examiner

*Primary Examiner* — Daniel Tsui
(74) *Attorney, Agent, or Firm* — F. Chau & Associates, LLC (57) ABSTRACT

The present invention provides a method and apparatus for data swap in a virtual machine environment. The present invention provides a method for data swap in a virtual machine environment, including: in response to a swap request from a virtual machine, looking up storage space associated with the swap request; and allocating to the virtual machine free physical storage space, in a host, which matches the storage space, so that the free physical storage space logically becomes available storage space to the virtual machine; the virtual machine is running on the host, and the storage space is physical storage space in the host.

20 Claims, 8 Drawing Sheets

DATA SWAP IN VIRTUAL MACHINE ENVIRONMENT

BACKGROUND OF THE INVENTION

1. Field of the Invention

The present invention is related to memory management, and more specifically, to a method and apparatus for data swap in virtual machine environment.

2. Description of the Related Art

A virtual machine is a software-implemented machine that can execute various applications like a physical machine. A virtual machine runs on a host, and a virtual address of the virtual machine is mapped to a physical address of the host so as to enable the access to physical memory of the host.

Data swap technology is commonly used in memory management. For example, in a memory management system of a computer, when memory resources are in shortage, data with relatively low utilization can be swapped to other storage devices (e.g., a hard disk, a Flash memory, etc.) so as to release memory resources. The swapped data can be temporarily saved in other storage devices and accessed where necessary.

Various technical solutions for swapping data have been developed so far. However, various problems can arise when applying existing technical solutions to a virtual machine environment. Although a virtual machine is logically manifested as an independent computer, it can be distributed on a plurality of physical machines physically. Thus in a virtual machine environment, when data in a memory is swapped to another storage device, since this storage device can be a remote device, additional overheads can arise during data swapping. In addition, even a host where a virtual machine is located has free memory/storage resources locally, the virtual machine is not entitled to utilize these free memory/storage resources, but can only utilize the resources that are allocated in advance.

With the wide adoption of virtual machine technology, providers of virtual machines pay more and more attention to the operation efficiency of virtual machines. Therefore, how to improve the data swap efficiency in a virtual machine environment has become a key problem.

SUMMARY OF THE INVENTION

It is desired to develop a technical solution capable of swapping data locally in a virtual machine environment, and it is desired that the technical solution can accomplish the objective of data swap without performing remote and/or local data copy. Further, it is desired to implement the technical solution with as less as possible changes on existing virtual machine configurations.

In one aspect of the present invention, there is provided a method for data swap in virtual machine environment. The method includes: looking up storage space associated with the swap request in response to a swap request from a virtual machine; and allocating to the virtual machine free physical storage space, in a host, the physical storage space matches the storage space, so that the free physical storage space logically becomes available storage space to the virtual machine; the virtual machine is running on the host.

In another aspect of the present invention, there is provided an apparatus for data swap in a virtual machine environment. The apparatus includes: a lookup module configured to, look up storage space associated with the swap request, in response to a swap request from a virtual machine; and an allocation module configured to allocate to the virtual machine free physical storage space, in a host, the physical storage space matches the storage space, so that the free physical storage space logically becomes available storage space to the virtual machine; the virtual machine is running on the host, and the storage space is physical storage space in the host.

White existing virtual machine configurations is changed as less as possible, time overheads for data swap can be greatly reduced and operation efficiency of the virtual machine improved further with the method and apparatus of the present invention. In addition, the method and apparatus of the present invention achieve a data swap solution locally implemented in a host of the virtual machine, which can significantly reduce reliance of the data swap on communication resources and further decrease workloads caused by the data swap.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or one embodiment combining software and hardware aspects that can generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
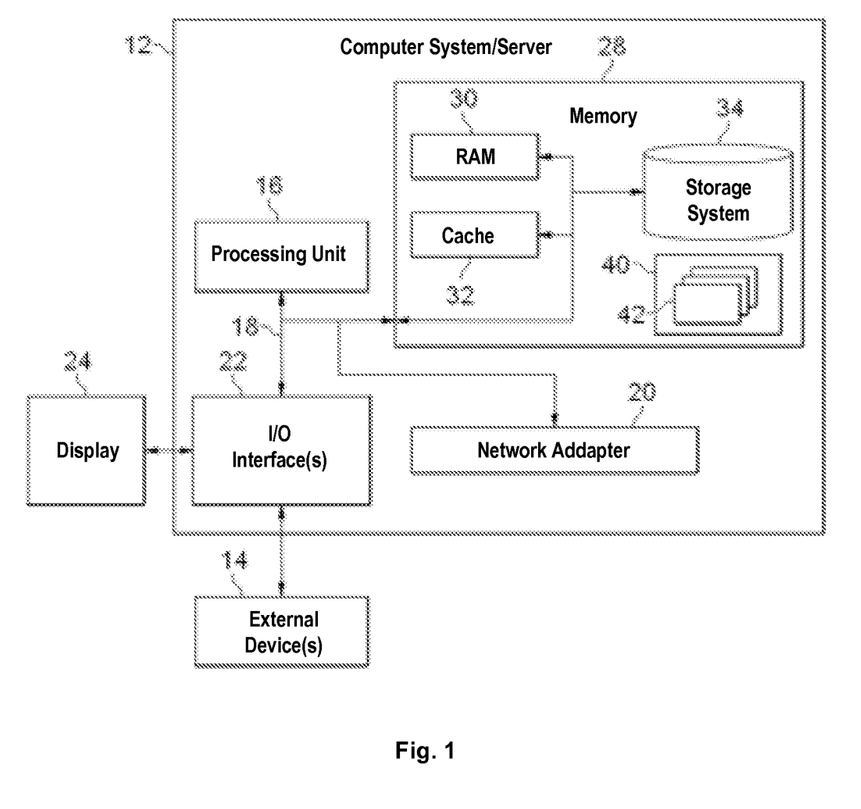
FIG. 1 illustrates an exemplary computer system/server 12 which is applicable to implement the embodiments of the present invention.

FIG. 1 illustrates an exemplary computer system/server 12 which is applicable to implement the embodiments of the present invention. The computer system/server 12 as illustrated in FIG. 1 is only an example, which should not construct any limitation to the functions and application scope of the embodiments of the present invention.

As illustrated in FIG. 1, the computer system/server 12 is embodied in the form of a general computing device. Components of the computer system/server 12 can include, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically includes various kinds of computer system-readable mediums. These mediums can be any available mediums accessible by the computer system/server 12, including volatile and non-volatile mediums, mobile and non-mobile mediums.

The system memory 28 can include a computer system readable medium in a form of volatile memory, for example, a random access memory (RAM) 30 and/or a cache memory 32. The computer system/server 12 can further include other mobile/non-mobile, volatile/non-volatile computer system storage mediums. As an example, the memory system 34 can be used to read/write a non-mobile, non-volatile magnetic medium (not illustrated in FIG. 1, generally called "a hard disk driver"). Although not illustrated in FIG. 1, a magnetic disk driver for reading/writing a mobile, non-volatile magnetic disk (for example, a "floppy disk") and an optical disk driver for reading/writing a mobile, non-volatile optical disk (for example, CD-RON, DVD-RON, or other optical medium) can be provided. In these cases, each driver can be connected to the bus 18 via one or more data medium interfaces. The memory 28 can include at least one program product that has a set (for example, at least one) program modules, and these program modules can be configured to perform the functions of various embodiments of the present invention.

A program/utility tool 40 including a set (at least one) of a program module 42 can be stored in for example the memory 28; such program module 42 includes, but not limited to, an operating system, one or more applications, other program modules, and program data, and each of these examples or a certain combination thereof can include implementation of a network environment. The program module 42 generally executes the functions and/or methods in the embodiments as described according to the present invention.

The computer system/server 12 can also communicate with one or more peripheral devices 14 (for example, a keypad, a pointing device, a display 24, etc.), and can also communicate with one or more device that enable the user to interact with the computer system/server 12, and/or communicate with any device (for example, network card, modem, etc.) that enables the computer system/server 12 to communicate with one or more other computing devices. Such communication can be performed via an input/output (I/O) interface 22. Moreover, the computer system/server 12 can also communicate with one or more networks (for example, a local area network (LAN), a wide area network (WAN), and/or a public network, for example, Internet). As illustrated in the figure, a network adaptor 20 communicates with other modules of the computer system/server 12 via the bus 18. It should be appreciated that although not illustrated in the figure, other hardware and/or software modules can be used in combination with the computer system/server 12, including, but not limited to, micro-code, device driver, redundancy processing unit, external disk driving array, RAID system, magnetic tape driver, and a data backup storage system, etc.

Note one or more virtual machines can run on one or more computer systems/servers described above, and a single virtual machine can be distributed on one or more computer systems/servers. The computer system/server illustrated with reference to FIG. 1 is merely an example used for implementing the method and apparatus of the present invention. With the development of hardware technology and virtual machine technology, the method and apparatus of the present invention can be implemented on other devices with a data processing capability.

Figure 2A:
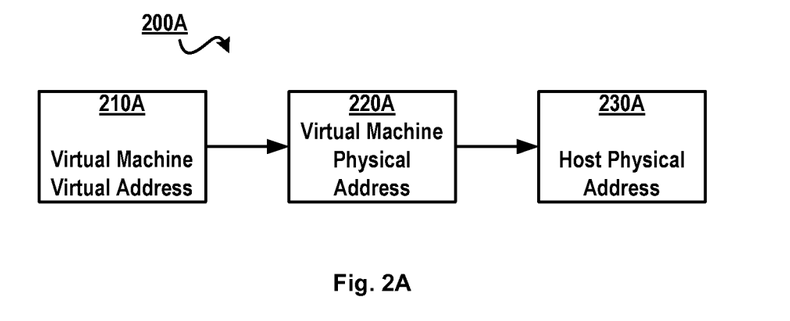
FIG. 2A schematically illustrates an address mapping relationship between a virtual machine and host, and FIG. 2B schematically illustrates a diagram of data swap according to one solution.

FIG. 2A schematically illustrates an address mapping relationship 200A between a virtual machine and a host. Since the virtual machine is running on the host, a memory seen by the virtual machine is actually a part of a memory of the host. Like an ordinary computer, the an address of the virtual machine can include a virtual address and a physical address, which are called a virtual machine virtual address and a virtual machine physical address, respectively. As illustrated in FIG. 2, a virtual machine virtual address 210A is mapped to a virtual machine physical address 220A that, in turn, is mapped to a host physical address 230A. The virtual machine virtual address and the virtual machine physical address are visible to a user of the virtual machine, while the user can not know the host physical address.

Figure 2B:
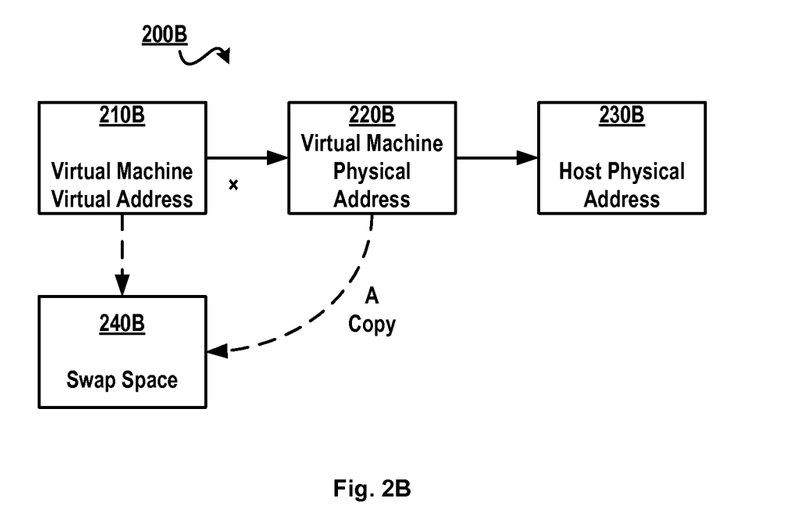

FIG. 2B schematically illustrates a diagram 200B of data swap according to one solution. In this embodiment, when the available space in a memory is insufficient, a data block in the memory can be copied to specific swap space (e.g., hard disk space). At this point, the space occupied by the copied data block can be used by other applications. When data in the data block is needed, it can be loaded from the swap space.

Specifically, a data block (e.g., a data interval represented by the virtual machine physical address) in virtual machine physical address 220B corresponding to virtual machine virtual address 210B can be copied to swap space 240B (as illustrated by arrow A). At this point, the mapping relationship between virtual machine virtual address 210B and virtual machine physical address 220B can be removed, and space represented by host physical address 230B turns to available space. In a virtual machine environment, however, swap space 240B can be a remote memory, so the step of copy as illustrated by arrow A can likely involve network data transmission. On the one hand, network traffic will be produced; and on the other hand, problems (such as a too long copy time) affect the data swap efficiency will arise.

In view of these drawbacks, the present invention provides a method for data swap in a virtual machine environment. The method allocates to a virtual machine local free physical storage space in a host, providing "local" data swap for the virtual machine. In addition, the method is implemented by adjusting an address mapping relationship between the virtual machine and the host, wherein no data copy operation is involved. Thus, the data swap efficiency is improved greatly.

Specifically, the method includes: in response to a swap request from a virtual machine, looking up storage space associated with the swap request; and allocating to the virtual machine free physical storage space, in a host, which matches the storage space, so that the free physical storage space becomes available storage space to the virtual machine logically; wherein the virtual machine is running on the host, and the storage space is physical storage space in the host.

Figure 3:
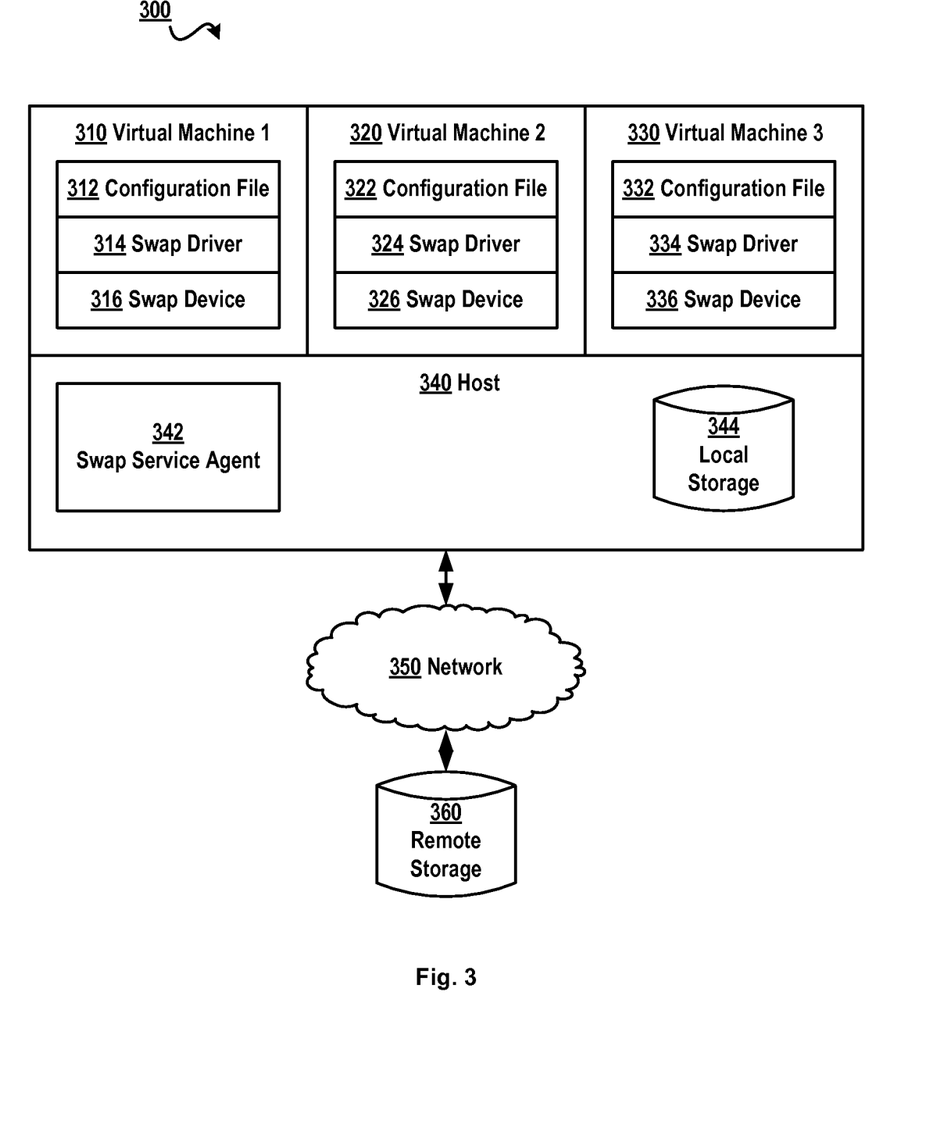
FIG. 3 schematically illustrates an architectural view of a technical solution for data swap in a virtual machine environment according to one embodiment of the present invention.

FIG. 3 schematically illustrates an architectural view 300 of a technical solution for data swap in a virtual machine environment according to one embodiment of the present invention. A virtual machine 1 310, a virtual machine 2 320 and a virtual machine 3 330 each are running on a host 340, wherein virtual machine 1 310 can include: a configuration file 332 for supporting a file system in automatic device mounting; a swap driver 334 for driving data swap according to the embodiments of the present invention; and a swap device 336 that, in the embodiment of the present invention, is not a swap device physically but a "fake" swap device implemented corresponding to a local storage device of the host and for redirecting a local data swap request from a virtual machine to a swap service agent at the host (e.g., a swap service agent 342 at host 340). Similarly, virtual machine 2 320 and virtual machine 3 330 each can have similar components, which is not detailed here.

Host 340 can include swap service agent 342 and local storage 344. In the embodiment of the present invention, swap service agent 342 can be used for collecting utilization conditions of the local memory of the host and forming swap space based on the swap request from the virtual machine; properly adjusting the swap space size to improve utilization efficiency of the swap space; and during virtual machine migration, collaborating with the swap service agent in the target host so as to achieve data synchronization. Furthermore, the host can be connected to remote storage 360 via a network 350.

In the embodiment of the present invention, the configuration file can be "etc/fstab" and can include, for example, the following content:

/path/swapfile none Swap sw, pri=3 0 0

Where "Swap" represents a Swap-type file system, i.e., a file system supporting data swap according to the embodiments of the present invention; "sw" represents super write access.

Figure 4:
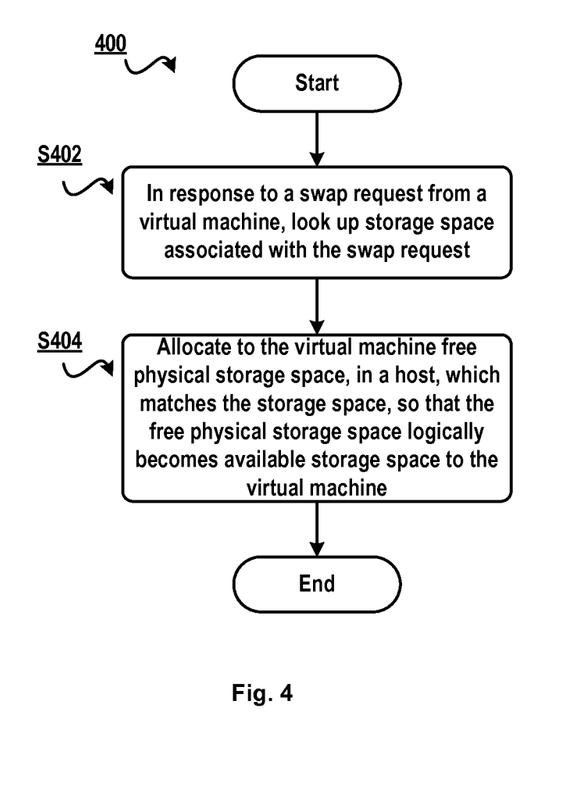
FIG. 4 schematically illustrates a flowchart of a method for data swap in a virtual machine environment according to one embodiment of the present invention.

FIG. 4 schematically illustrates a flowchart 400 of a method for data swap in a virtual machine environment according to one embodiment of the present invention. First of all, in step S402, in response to a swap request from a virtual machine, storage space associated with the swap request is looked up. In a virtual machine environment, a virtual machine virtual address is mapped to a virtual machine physical address that, in turn, is mapped to a host physical address. Thus, the storage space associated with the swap request can be looked up based on this mapping relationship. The storage space is physical storage space in a host on which the virtual machine is running.

In step S404, free physical storage space, in the host, which matches the storage space is allocated to the virtual machine, so that the free physical storage space becomes available storage space to the virtual machine logically, wherein the virtual machine is running on the host, and the storage space is physical storage space in the host. Compared with the technical solution, as illustrated with reference to FIG. 2, for copying data in to-be-swapped space to swap space such that the to-be-swapped space turns available, the method for the present invention needs no data copy. Instead, the method for the present invention first marks the scope of physical addresses of to-be-swapped space in the host and then allocates free physical storage space to the virtual machine, thereby greatly reducing time overheads produced by data copy.

In one embodiment of the present invention, between the step of lookup and the step of allocation there is further included: identifying the scope of physical addresses of the storage space in the host as swap space.

In this embodiment, the purpose of identifying the scope of physical addresses of the storage space in the host as swap space is to mark the scope of physical addresses of the storage space in the host so that data in the storage space can be obtained fast when needed again.

In one embodiment of the present invention, there is further included: in response to an access request to the storage space, accessing the storage space via the swap space. Note according to the embodiment of the present invention, when allocating free physical storage space in the host to the virtual machine, no data overwrite operation is produced, so the storage space can be accessed via the marked physical address where necessary.

In one embodiment of the present invention, the swap request at least includes: an identifier of the virtual machine and a virtual address of the storage space in the virtual machine. Since one or more virtual machines can run on one host, the swap request should include an identifier of the virtual machine. A location of the to-be-swapped storage space can be described by the scope of virtual addresses. Those skilled in the art can design a format of a data swap request, which, for example, is illustrated as below:

Local Swap Request: VM 001, Address [A,B]

The request can be interpreted as performing local data swap according to the present invention, wherein the to-be-swapped data space is the address scope [A, B] on a virtual machine 001. Note the data swap request is merely illustrative but not limiting. Based on the disclosure of this specification, those skilled in the art can design other formats to represent the data swap request.

In one embodiment of the present invention, the identifying the scope of physical addresses of the storage space in the host as swap space includes: based on the virtual address and the identifier of the virtual machine, obtaining a virtual machine physical address of the storage space in the virtual machine; and based on the virtual machine physical address, obtaining a physical address of the storage space in the host.

Due to the address mapping relationship between the virtual machine and the host, the scope of physical addresses in the host should be obtained in the order of "virtual machine virtual address→virtual machine physical address→host physical address."

In one embodiment of the present invention, the allocating free physical storage space, in the host, which matches the storage space to the virtual machine so that the free physical storage space becomes available storage space to the virtual machine logically includes: selecting free physical storage space in the host whose size is equal to the storage space; and associating a physical address of the free physical storage space in the host with the virtual machine physical address of the storage space in the virtual machine. This will be explained in detail below with reference to FIG. 5.

Figure 5:
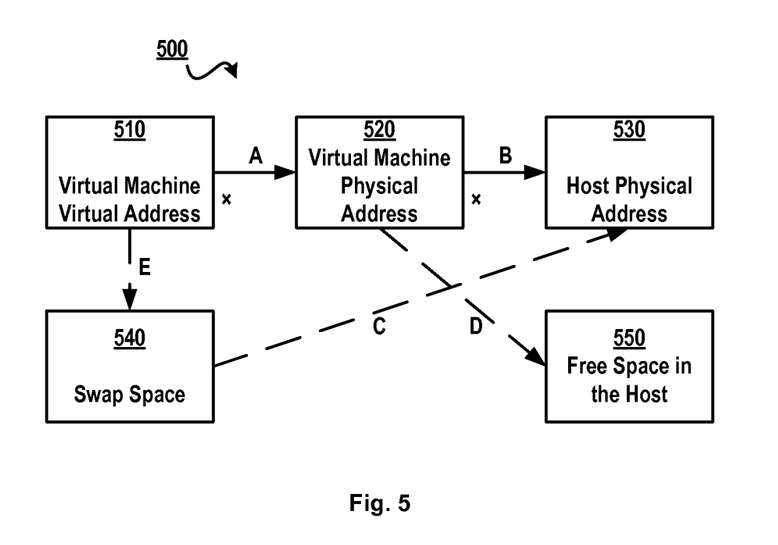
FIG. 5 schematically illustrates address mapping relationships in a method for data swap in a virtual machine environment according to one embodiment of the present invention.

FIG. 5 schematically illustrates address mapping relationships 500 in a method for data swap in a virtual machine environment according to one embodiment of the present invention. Before implementing the method for data swap according to the present invention, a virtual machine virtual address 510 is mapped to a virtual machine physical address 520 (as illustrated by solid arrow A), while virtual machine physical address 520 is further mapped to a host physical address 530 (as illustrated by solid arrow B).

When implementing the method according to the present invention, the scope of physical addresses of the storage space in the host is identified as swap space 540 (as illustrated by dotted arrow C). At this point, free physical storage space 550 in the host is free physical storage space whose size is equal to to-be-swapped space. A physical address 550 of the free physical storage space in the host is associated with virtual machine physical address 520 of the storage space in the virtual machine (as illustrated by dotted arrow D).

In addition, since virtual machine physical address 520 is now pointing to the free physical storage space, the associating relationships between virtual machine virtual address 510 and virtual machine physical address 520 and between virtual machine physical address 520 and host physical address 530 can be rescinded.

Since the virtual machine is running on the host, the physical address of the virtual machine is not a real physical address but actually corresponds to the physical address of the host. In the steps illustrated by arrows C and D, merely address remapping is implemented, and no data copy operation is performed. The efficiency of address mapping operation is far higher than the efficiency of data copy operation, so the embodiments of the present invention can greatly improve the efficiency of data swap. Further note since data in the storage space represented by host physical address 530 is not overwritten, data on which "local data swap" has been performed can be accessed based on swap space 540 where necessary (as illustrated by arrows E and C).

In one embodiment of the present invention, there is further included an initialization step of: in response to a device mounting request from the virtual machine, establishing a channel for transmitting data associated with the swap request. The initialization step can build a particular communication channel between the virtual machine and the host, so as to support data swap according to the embodiments of the present invention. For example, when it is detected at the virtual machine that the virtual machine desires to execute data swap, a data swap request can be sent to the host via the channel; when local swap is completed at the host, an execution result can be returned to the virtual machine. For example, a returned value "True" can represent success, while a returned value "False" can represent failure. Furthermore, other returned values like error code can be defined.

In one embodiment of the present invention, the device mounting request can be generated through the steps of: driving a swap device defined by a configuration file; and generating the device mounting request based on the swap device. Specifically, description is presented below with reference to FIG. 6.

Figure 6:
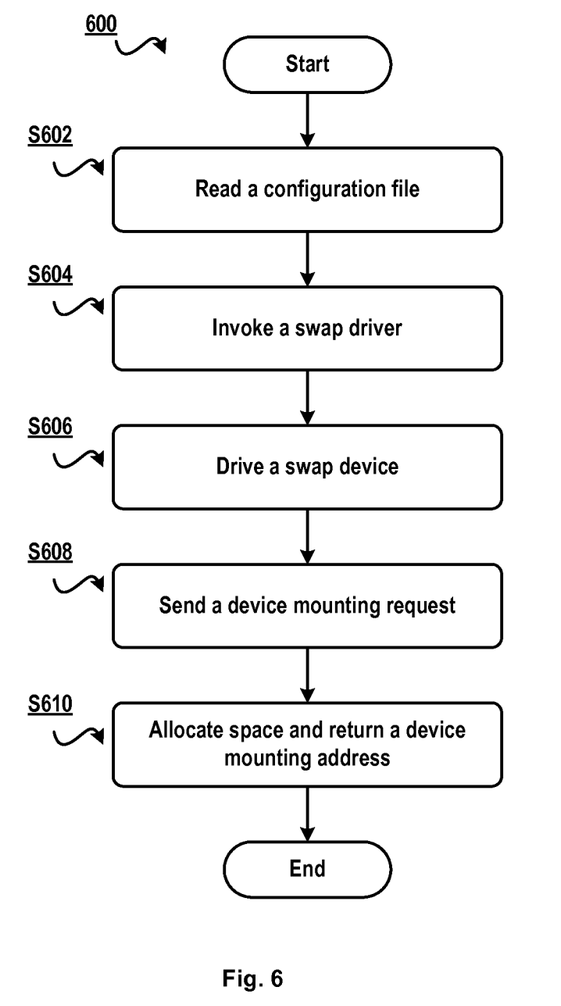
FIG. 6 schematically illustrates an initialization step in a method for data swap in a virtual machine environment according to one embodiment of the present invention.

FIG. 6 schematically illustrates an initialization step 600 in a method for data swap in a virtual machine environment according to one embodiment of the present invention. Steps S602-S608 illustrates concrete steps of generating and sending a device mounting request. In step S602, a configuration file is read. The configuration file defines which type of file system is to be mounted by the virtual machine; for example, "etc/fstab" as described above defines a Swap file system for local data swap. Next, a swap driver is invoked (step S604) to drive a "fake" swap device specified in the configuration file (step S606). Afterwards, a device mounting request is sent in step S608 (in this embodiment, the device mounting request is a request for device mounting of the "fake" swap device). In step S610, space is allocated to the virtual machine and a device mounting address is returned. At this point, a channel for achieving the local swap request can be established between the virtual machine and the host.

The process of device-mounting the "fake" swap device that supports a local swap request has been illustrated above with reference to FIG. 6. However, those skilled in the art should note other solutions for device mounting can be designed and implemented based on different virtual machine environments.

As the method for local data swap in a virtual environment has been described above, now detailed description is presented regarding how to migrate the virtual machine in the present invention. For migrating a virtual machine, means migrating a virtual machine that is running on a host to a new target host. Reasons to migrate a virtual machine are that, for example, storage resources and computing capability of a current host cannot satisfy the demand of the virtual machine, etc.

When migrating the virtual machine that supports the data swap described in the present invention, besides executing traditional migration steps, when data is "locally swapped" to swap space, data in the swap space should be subjected to special processing; otherwise, the virtual machine can be migrated conventionally.

Additional workloads can be caused when migrating the virtual machine. However, since migrating the virtual machine will involve collaboration between various parties, migration is implemented only in several circumstances (for example, a source virtual machine breaks down or various resources do not satisfy demands of the virtual machine). Data swap in the virtual machine is conventional operation while the virtual machine is running normally, and can be implemented frequently. Thus, although the technical solution of the present invention will levy some burden on the migration of a virtual machine, the burden is tolerable, considering that the performance of the virtual machine can be improved greatly. Note before migration, judgment is made as to whether the target host supports the local data swap of the present invention or not. Concrete steps of migration will be described in detail below.

In one embodiment of the present invention, in response to a migration request for migrating the virtual machine from the host to a target host, judgment is made as to whether the target host supports the local data swap or not; in response to the target host not supporting the local data swap: the swap space is used as remote storage space of the migrated virtual machine, or data in the swap space is sent to a storage device accessible by the migrated virtual machine.

When the target host does not support the local data swap (i.e., the target host is an ordinary host that does not have a system architecture as illustrated in FIG. 3), the migrated virtual machine can be caused to operate according to a traditional data swap manner (e.g., as illustrated in FIG. 2B). At this point, the swap space of the virtual machine in the source host can be used as ordinary swap space of the migrated virtual machine (i.e., like conventional data swap, the virtual machine swaps data to remote storage space). When the migrated virtual machine needs to access the previously swapped data, the data can be read from the swap space in the source host. Furthermore, data in the swap space can be sent to any storage device accessible by the migrated virtual machine. The physical location of a storage device is not limited here, so long as the storage device is accessible by the migrated virtual machine.

In one embodiment of the present invention, there is further included: in response to the target host supporting the local data swap, judgment is made as to whether there is shared space between the host and the target host or not; in response to there being shared space between the host and the target host, data in the swap space is moved to the shared space and the target host is notified.

When the target host supports the local data swap of the present invention, data in the swap space of the source host needs to be moved to a local memory of the target host so as to be read where necessary. Those skilled in the art can appreciate when there is shared space between the source host and the target host, moving data in the swap space to the shared space is a high-efficiency approach to transmitting data to the target host. After data in the swap space is moved to the shared space, the target host can be notified to perform subsequent steps in migrating to the virtual machine, such as reactivating the migrated virtual machine, etc.

In one embodiment of the present invention, in response to there being no shared space between the host and the target host, data in the swap space is sent to local storage space of the target host, and the target host is notified. When there is no shared space between the source host and the target host, data in the swap space can be sent to the target host. At this point, local swap space can be created in physical storage space of the target host, so that the data is accessed where necessary.

Figure 7:
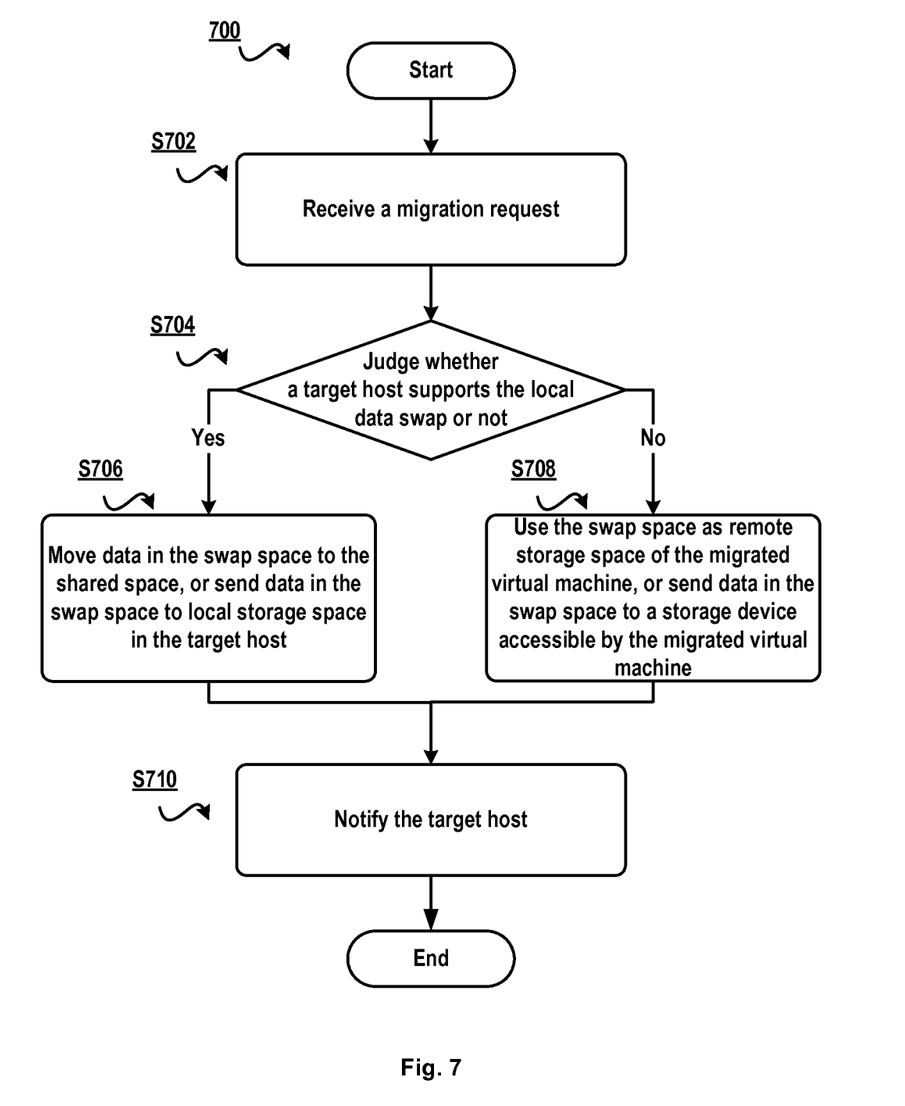
FIG. 7 schematically illustrates a flowchart of steps of migrating a virtual machine that supports data swap according to one embodiment of the present invention.

FIG. 7 schematically illustrates a flowchart 700 of steps of migrating a virtual machine that supports data swap according to one embodiment of the present invention. First of all, a migration request is received in step S702. Then in step S704, judgment is made as to whether a target host supports local data swap or not. If "Yes," the flow proceeds to step S706 in which data in swap space is moved to shared space between a source host and the target host or is sent to local storage space of the target host. When the target host does not support the local data swap, in step S708 the swap space in the source host can be used as remote storage space of the migrated virtual machine (i.e., unnecessary to send data to the target host via a network), or data in the swap space is sent to a storage device accessible by the migrated virtual machine. In step S710, the target host can be notified whether and how data in the swap space of the source host is sent to the target host, so that the target host can respond accordingly.

In one embodiment of the present invention, the local data swap can be implemented in the swap service agent at the host.

Figure 8:
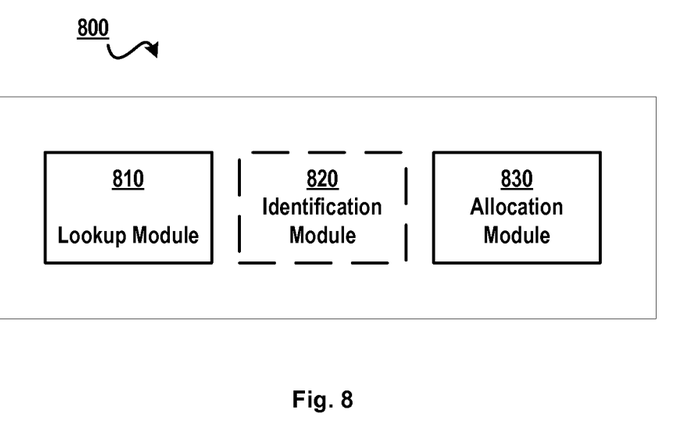
FIG. 8 schematically illustrates a block diagram of an apparatus for data swap in a virtual machine environment according to one embodiment of the present invention.

FIG. 8 schematically illustrates a block diagram 800 of an apparatus for data swap in a virtual machine environment according to one embodiment of the present invention. The apparatus includes: a lookup module 810 configured to, in response to a swap request from a virtual machine, look up storage space associated with the swap request; an allocation module 830 configured to allocate to the virtual machine free physical storage space, in a host, which matches the storage space, so that the free physical storage space logically becomes available storage space to the virtual machine; wherein the virtual machine is running on the host, and the storage space is physical storage space of the host.

In one embodiment of the present invention, the swap request includes: an identifier of the virtual machine and a virtual address of the storage space in the virtual machine.

In one embodiment of the present invention, between the looking up step and the allocating step there is further included: identifying the scope of physical addresses of the storage space in the host as swap space.

In one embodiment of the present invention, there is further included: accessing the storage space via the swap space in response to an access request with respect to the storage space.

In one embodiment of the present invention, the swap request at least includes: an identifier of the virtual machine and a virtual address of the storage space in the virtual machine.

In one embodiment of the present invention, there is further included: an identification module configured to identify the scope of physical addresses of the storage space in the host as swap space.

In one embodiment of the present invention, there is further included: an access module configured to access the storage space via the swap space in response to an access request with respect to the storage space.

In one embodiment of the present invention, the swap request at least includes: an identifier of the virtual machine and a virtual address of the storage space in the virtual machine.

In one embodiment of the present invention, there is further included: an identification module 820 configured to identify the scope of physical addresses of the storage space in the host as swap space; and an access module configured to access the storage space via the swap space in response to an access request with respect to the storage space.

In one embodiment of the present invention, identification module 820 includes: a first obtaining module configured to obtain a virtual machine physical address of the storage space in the virtual machine based on the identifier of the virtual machine and the virtual address; and a second obtaining module configured to obtain a physical address of the storage space in the host based on the virtual machine physical address.

In one embodiment of the present invention, the allocation module includes: a selection module configured to select free physical storage space in the host, whose size is equal to the storage space; and an association module configured to associate a physical address of the free physical storage space in the host with a virtual machine physical address of the storage space in the virtual machine.

In one embodiment of the present invention, there is further included: an initialization module configured to, in response to a device mounting request from the virtual machine, establish a channel used for transmitting data associated with the swap request.

In one embodiment of the present invention, the device mounting request is generated by the following modules: a driving module configured to drive a swap device defined by a configuration file; and a generation module configured to generate the device mounting request based on the swap device.

In one embodiment of the present invention, there are further included: a first judgment module configured to, in response to a migration request for migrating the virtual machine from the host to a target host, judge whether the target host supports the local data swap or not; and a first migration module configured to, in response to the target host not supporting the local data swap: use the swap space as remote storage space of the migrated virtual machine, or send data in the swap space to a storage device accessible by the migrated virtual machine.

In one embodiment of the present invention, there are further included: a second judgment module configured to, in response to the target host supporting the local data swap, judge whether there is shared space between the host and the target host or not; and a second migration module configured to, in response to there being shared space between the host and the target host, move data in the swap space to the shared space and notify the target host.

In one embodiment of the present invention, there is further included: a third migration module configured to, in response to there being no shared space between the host and the target host, send data in the swap space to local storage space of the target host and notify the target host.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks illustrated in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for data swap in a virtual machine environment, comprising:
    establishing a channel used for transmitting data associated with a swap request, in response to a device mounting request from a virtual machine;
    looking up storage space associated with the swap request, in response to the swap request from the virtual machine; and allocating to the virtual machine free physical storage space in a host wherein the free physical storage space matches the storage space, so that the free physical storage space logically becomes available storage space to the virtual machine;
wherein the virtual machine is running on the host.

2. The method according to claim 1, wherein the swap request comprises:
an identifier of the virtual machine; and
a virtual address of the storage space in the virtual machine.

3. The method according to claim 1, wherein allocating to the virtual machine free physical storage space, in a host, further comprises:
selecting free physical storage space in the host, wherein the size of the physical storage space is equal to the storage space; and
associating a physical address of the free physical storage space in the host with a virtual machine physical address of the storage space in the virtual machine.

4. The method according to claim 1, wherein between the looking up step and the allocating step, the method further comprises:
identifying the scope of physical addresses of the storage space in the host as swap space.

5. The method according to claim 4, further comprising:
accessing the storage space via the swap space in response to an access request with respect to the storage space.

6. The method according to claim 4, wherein identifying the scope of physical addresses of the storage space in the host as swap space comprises:
obtaining a virtual machine physical address of the storage space in the virtual machine based on the identifier of the virtual machine and the virtual address; and
obtaining a physical address of the storage space in the host based on the virtual machine physical address.

7. The method according to claim 1, wherein the device mounting request is generated through the steps of:
driving a swap device defined by a configuration file; and
generating the device mounting request based on the swap device.

8. The method according to claim 3, further comprising:
judging whether a target host supports the data swap, in response to a migration request for migrating the virtual machine from the host to the target host; and
in response to the target host not supporting the data swap:
either using the swap space as remote storage space of the migrated virtual machine,
or sending data in the swap space to a storage device accessible by the migrated virtual machine.

9. The method according to claim 8, further comprising:
judging whether there is shared space between the host and the target host, in response to the target host supporting the local data swap; and
moving data in the swap space to the shared space and notifying the target host, in response to there being shared space between the host and the target host.

10. The method according to claim 9, further comprising:
sending data in the swap space to local storage space of the target host and
notifying the target host, in response to there being no shared space between the host and the target host.

11. An apparatus for data swap in a virtual machine environment, comprising:
an initialization module configured to establish a channel used for transmitting data associated with a swap request, in response to a device mounting request from the virtual machine;
a lookup module configured to look up storage space associated with the swap request, in response to the swap request from a virtual machine; and
an allocation module configured to allocate to the virtual machine free physical storage space, in a host wherein the physical storage space, matches the storage space, so that the free physical storage space becomes available storage space to the virtual machine;
wherein the virtual machine is running on the host.

12. The apparatus according to claim 11, wherein the swap request comprises:
an identifier of the virtual machine and a virtual address of the storage space in the virtual machine.

13. The apparatus according to claim 11, wherein the allocation module comprises:
a selection module configured to select free physical storage space in the host, wherein the size of the physical storage space is equal to the storage space; and
an association module configured to associate a physical address of the free physical storage space in the host with a virtual machine physical address of the storage space in the virtual machine.

14. The apparatus according to claim 11, further comprising:
an identification module configured to identify the scope of physical addresses of the storage space in the host as swap space.

15. The apparatus according to claim 14, further comprising:
an access module configured to access the storage space via the swap space in response to an access request with respect to the storage space.

16. The apparatus according to claim 14, wherein the identification module comprises:
a first obtaining module configured to obtain a virtual machine physical address of the storage space in the virtual machine based on the identifier of the virtual machine and the virtual address; and
a second obtaining module configured to obtain a physical address of the storage space in the host based on the virtual machine physical address.

17. The apparatus according to claim 11, wherein the device mounting request is generated by the following modules:
a driving module configured to drive a swap device defined by a configuration file; and
a generation module configured to generate the device mounting request based on the swap device.

18. The apparatus according to claim 13, further comprising:
a first judgment module configured to, judge whether a target host supports the data swap, in response to a migration request for migrating the virtual machine from the host to the target host; and
a first migration module configured to, in response to the target host not supporting the data swap:
either use the swap space as remote storage space of the migrated virtual machine,
or send data in the swap space to a storage device accessible by the migrated virtual machine.

19. The apparatus according to claim 18, further comprising:
a second judgment module configured to, judge whether there is shared space between the host and the target host, in response to the target host supporting the local data swap; and a second migration module configured to, move data in the swap space to the shared space and notify the target host, in response to there being shared space between the host and the target host.

20. The apparatus according to claim 19, further comprising:
a third module configured to, send data in the swap space to local storage space of the target host and notify the target host, in response to there being no shared space between the host and the target host.

* * * * *